T. CARR.
NUT LOCK.
APPLICATION FILED FEB. 13, 1915.
1,181,109.
Patented May 2, 1916.
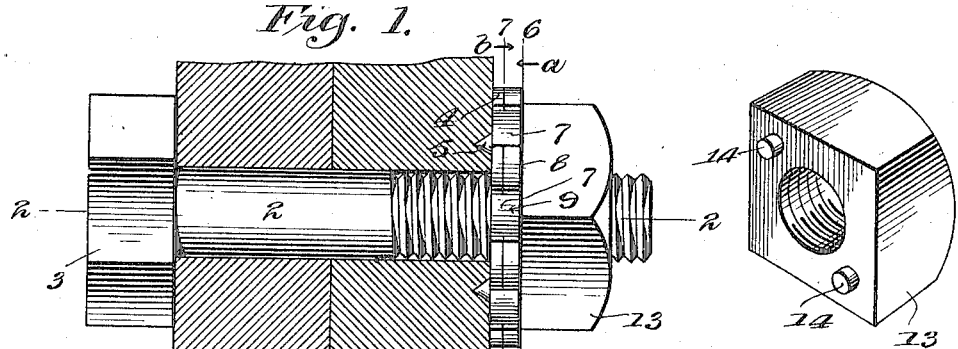
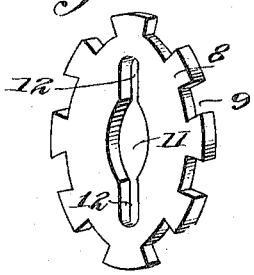
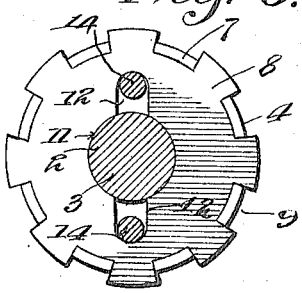
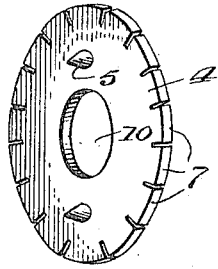
Inventor
Thomas Carr
By Victor J. Evans
Attorney
Witnesses

UNITED STATES PATENT OFFICE.

THOMAS CARR, OF ACOSTA, PENNSYLVANIA.

NUT-LOCK.

1,181,109. Specification of Letters Patent. Patented May 2, 1916.

Application filed February 13, 1915. Serial No. 8,010.

*To all whom it may concern:*

Be it known that I, THOMAS CARR, a citizen of the United States, residing at Acosta, in the county of Somerset and State of Pennsylvania, have invented new and useful Improvements in Nut-Locks, of which the following is a specification.

The present invention relates to improvements in means for effectively locking a nut upon a bolt, and the primary object of the invention is to provide a device of this character which shall be of a simple construction, easily attached to or removed from the bolt and nut and which performs its functions with accuracy and with efficiency.

With the above and other objects in view, the improvement resides in the construction, combination and arrangement of parts set forth in the following specification and falling within the scope of the appended claim.

In the drawing: Figure 1 is a side elevation illustrating my improvement in applied position, Fig. 2 is a longitudinal sectional view approximately on the line 2—2 of Fig. 1, Fig. 3 is a perspective view of the nut looking toward its inner face, Fig. 4 is a similar view of the nut engaging washer, Fig. 5 is a similar view of the locking member for the nut engaging washer, Fig. 6 is a sectional view on the line 6—6 of Fig. 1 looking in the direction of the arrow *a*, and Fig. 7 is a similar sectional view on the line 7—7 of Fig. 1 looking in the direction of the arrow *b*.

Referring now to the drawing in detail, the numerals 1 indicate two plates provided each with an opening through which passes the threaded shank 2 of a bolt 3. Arranged upon the projecting end of the shank 2 of the bolt is a washer member 4, the same having its inner face provided with spurs 5 which are adapted to be forced in the outer face of one of the plates 1. The washer 4 has one or both of its faces provided with a depression 6 which is concentric of its periphery and the said washer, from the said depressions is slitted radially and outwardly, the said slits extending through its periphery or outer edge and providing the washer with a plurality of bendable fingers 7.

The numeral 8 indicates what I term the nut locking washer, the same being provided at its edge or periphery with a plurality of spaced depressions 9, each of said depressions being of a length equaling the length of each of the fingers 7 of the washer 4. Both the washers 4 and 8 are provided with bolt receiving openings indicated by the numerals 10 and 11 respectively, and the washer 8 is provided with diagonally opposite notches 12—12 which communicate with its central opening 11.

The nut is indicated by the numeral 13 and is provided adjacent its bore with diagonally opposite studs 14—14 which are adapted to be received within the depressions 12 of the washer 8.

The washer 4, as stated, is first arranged upon the bolt and has its spurs entering one of the plates. The washer 8 is arranged upon the inner face of the nut 13, its studs 14 being received within the depressions, as stated. The nut 13 and washer 8 may be rotated in unison upon the threaded shank 2 of the bolt 3 until the nut forces the washer 8 into tight contact with the washer 4. It should be stated that the studs 14 are of a less length than the thickness of the washer or nut locking member 8 so that the same will not necessarily project through the depressions 12 and contact with the outer face of the washer 4. With the elements in the device as just described, certain of the fingers 7 are bent outwardly of the plate 1 to be received within the notches 9 of the nut locking member or washer 8.

It is, of course, to be understood that the fingers may be flattened by a suitable instrument to permit of the separation of the nut from the bolt.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

The herein described means for locking a nut upon a bolt including a washer arranged upon the shank of the bolt and having one of its faces provided with inwardly projecting studs, the faces of said washer having depressions concentric with the central bolt opening thereof and being slitted radially from the said depressions to the periphery of the washer to provide a plurality of bendable fingers, a locking washer also arranged upon the shank of the bolt and having spaced depressions to receive one of the fingers of the first mentioned washer when the same is bent therein, said locking washer having diametrically opposite slots which communicate with its central opening, a nut threaded upon the shank of the bolt and having diagonally opposite studs adapted to be received within the said slots of the locking washer, all as and for the purpose set forth.

In testimony whereof I affix my signature in presence of two witnesses.

THOMAS CARR.

Witnesses:
NORMAN KRAFT,
JACOB HEMMINGER.

Copies of this patent may be obtained for five cents each, by addressing the "Commissioner of Patents, Washington, D. C."